United States Patent [19]

Ito

[11] Patent Number: 4,623,827

[45] Date of Patent: Nov. 18, 1986

[54] DEVICE FOR CONTROLLING MOTOR ROTATION SPEED

[75] Inventor: Norifumi Ito, Yokohama, Japan

[73] Assignee: Ricoh Company, Ltd., Tokyo, Japan

[21] Appl. No.: 826,376

[22] Filed: Feb. 5, 1986

[30] Foreign Application Priority Data

Feb. 9, 1985 [JP] Japan .................................. 60-22774
Feb. 22, 1985 [JP] Japan .................................. 60-32860

[51] Int. Cl.$^4$ ............................................. H02P 5/16
[52] U.S. Cl. ..................................... 318/341; 318/609; 318/610; 318/599
[58] Field of Search ................ 318/341, 599, 609, 610

[56] References Cited

U.S. PATENT DOCUMENTS

| 4,408,148 | 10/1983 | Herzog ................................ 318/610 |
| 4,422,025 | 12/1983 | Steller ................................. 318/609 |
| 4,500,830 | 2/1985 | Gotou et al. ..................... 318/341 X |
| 4,520,301 | 5/1985 | Suzuki ................................ 318/609 |

Primary Examiner—B. Dobeck
Attorney, Agent, or Firm—Oblon, Fisher, Spivak, McClelland & Maier

[57] ABSTRACT

A motor speed control device for variably controlling the rotation speed of a motor over a wide range. The control device performs proportional integration (PI) using an actual motor speed and a set motor speed and applies the resulting amount of operation to a pulse wave modulator, thereby feedback controlling the motor rotation. A constant assigned to a speed compute section is variable to finely adjust the motor speed. A plurality of proporational gains $K_p$ and a plurality of integral gains are selected one at a time each according to the set motor speed. The PI operation, selection of a constant and speed computation are performed inside of a single CPU.

10 Claims, 8 Drawing Figures

SERIAL COMMUNICATION

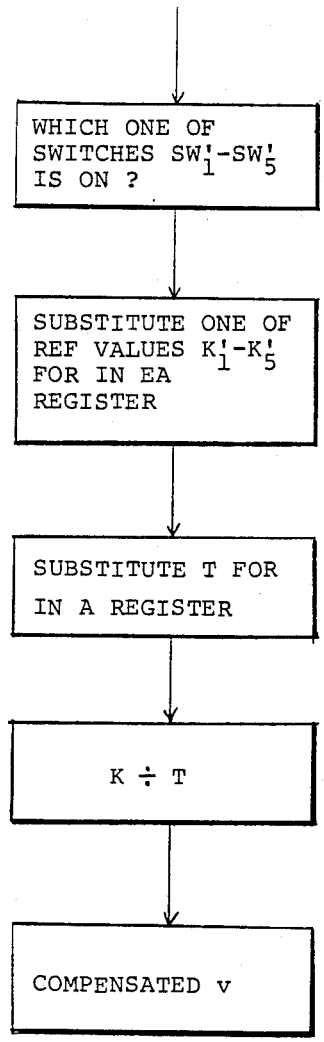

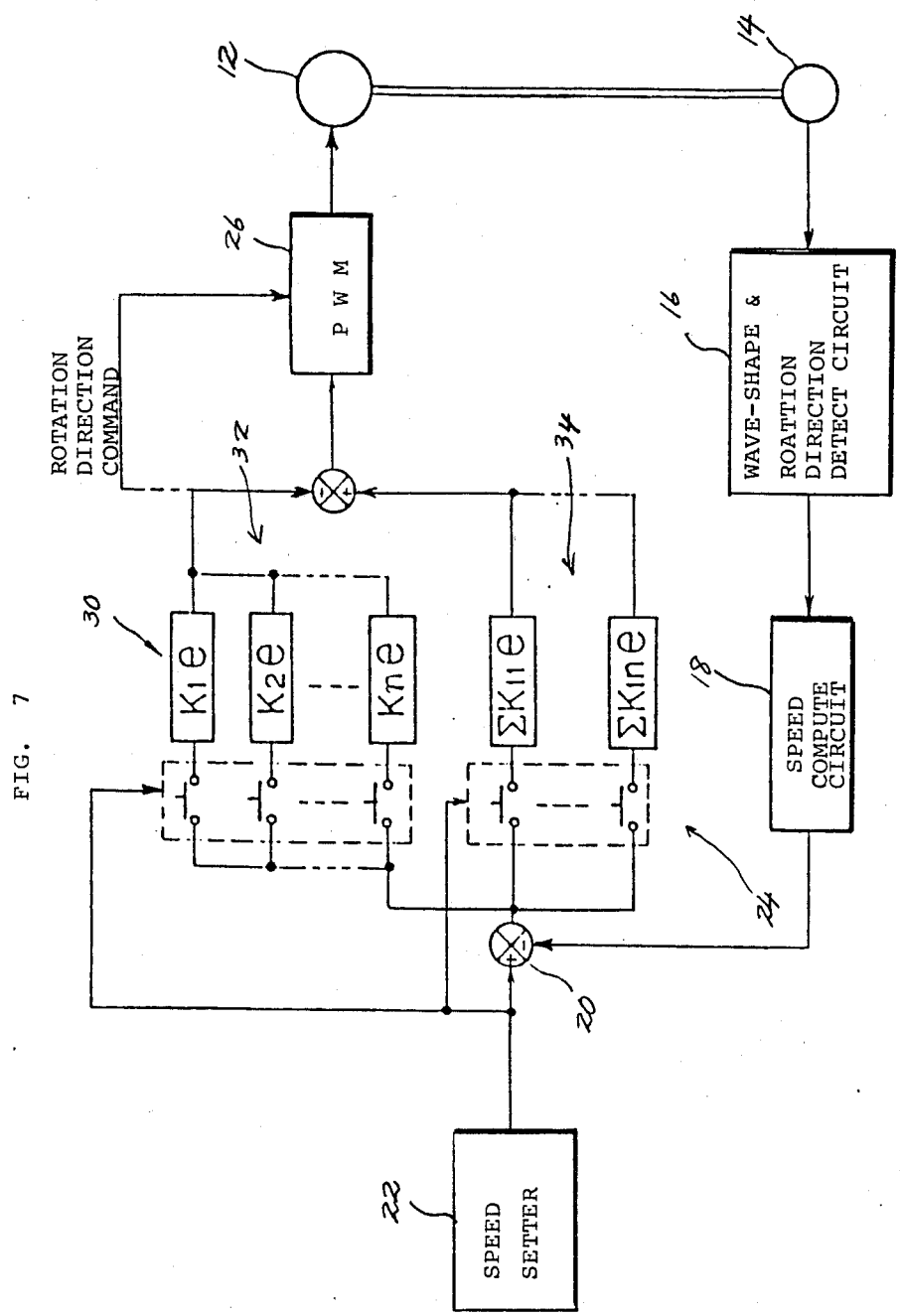

DEVICE FOR CONTROLLING MOTOR ROTATION SPEED

BACKGROUND OF THE INVENTION

The present invention relates to a device for controlling the rotation speed of a motor of the kind requiring variable rotation speed control over a relatively wide range, e.g. a DC motor adapted to drive a scanner of a copier on which an optical arrangement is mounted.

Today, various kinds of motors are used to drive various kinds of objects. For example, a DC motor is installed in a copier to drive a scanner which carries therewith optics for imaging at a predetermined speed in a predetermined direction. Many of modern copiers are furnished with a capability for enlarging or reducing the size of images to be copied. In a copier, the prerequisite for the variable magnification capability is that the moving speed of the scanner and, therefore, the rotation speed of the motor for driving the scanner be variable. Usually, the variable range of the motor speed necessary for variable magnification is expressed as:

$$V \leq v \leq 4V \qquad \text{Eq. (1)}$$

where v is a motor speed and V the lowest motor speed.

It will be seen from the Eq. (1) that the motor speed varies over a substantial range and, therefore, it needs to be set up in such a manner as to cover such a wide range.

The rotation of the motor is transmitted to the scanner and transformed into a linear motion of the latter by a mechanism which usually is made up of a gear, a pulley, a wire and others. The problem with those structural elements is that scattering is unavoidably introduced in the production stage or the assembly stage and due to wear which is atrributable to aging. Such scattering causes one scanner to move at a different speed from another even if the motor rotation speed is the same. To compensate for the scattering, motor rotation has to be finely adjusted.

It has been customary to implement the fine motor speed adjustment by varying the set speed of the motor. Where the magnification of images is changed on a 1% bases, for example, the set speed of the motor may also be varied on a 1% basis within the variable range as defined by the Eq. (1). However, where it is desired to change the magnification on a smaller order such as 0.1%, it is necessary for the set speed of the motor to be finely controlled on a 0.1% order within the defined variable range. Hence, the computation of a motor speed, proportional integration (PI) and others for the motor speed control have to be performed with accuracy which is great enough to follow such fine adjustment. This in turn requires intricate circuits, renders the control unstable, and needs readjustment to compensate for aging. Further, the motor speed has to be compensated every time it is accidentaly changed.

SUMMARY OF THE INVENTION

It is therefore an object of the present invention to provide a motor speed control device which variably controls the rotation of a motor over a wide range.

It is another object of the present invention to provide a motor speed control device which is capable of finely adjusting with ease the set speed of a motor which is controlled to a constant speed.

It is another object of the present invention to provide a device for controlling the rotation speed of a motor.

In one aspect of the present invention, there is provided a control device for varying a rotation speed of a motor within a predetermined range, comprising a speed setter for setting a desired rotation speed of the motor and producing an output representative of the set rotation speed. A rotary encoder operatively connected to the motor for generating a pulse signal having a pulse width which is associated with a rotation speed of the motor, a speed compute circuit for computing an actual rotation speed of the motor from the pulse width of the pulse signal outputted by the rotary encoder and producing an output representative of the actual rotation speed, the speed compute circuit having a constant for computation, a compare circuit for comparing the computed rotation speed outputted by the speed compute circuit with the set value outputted by the speed setter and producing a difference signal representative of a difference between the computed rotation speed and the set value, a proportional integration compute circuit for performing proportional integration responsive to the difference signal outputted by the compare circuit and producing an output representative of an amount of operation based on a result of the computation, a pulse width modulator for producing an output by pulse width modulating the output of the proportional integration computate circuit and controlling the rotation speed of the motor by the output, and a constant change circuit for changing the constant of the speed compute circuit.

In another aspect of the present invention, there is provided a control device for varying a rotation speed of a motor within a predetermined range, comprising a speed setter for setting a desired rotation speed of the motor and producing an output representative of the set rotation speed, a rotary encoder operatively connected to the motor for generating a pulse signal having a pulse width which is associated with a rotation speed of the motor, a speed compute circuit for computing an actual rotation speed of the motor from the pulse width of the pulse signal outputted by the rotary encoder and producing an output representative of the actual rotation speed, a compare circuit for comparing the computed rotation speed outputted by the speed compute circuit with the set value outputted by the speed setter and producing a difference signal representative of a difference between the computed rotation speed and the set value, a proportional integration compute circuit for performing proportional integration responsive to the difference signal outputted by the compare circuit and producing an output representative of an amount of operation based on a result of the computation, the proportional integration compute circuit having a plurality of proportional gains and a plurality of integral gains, a pulse width modulator for producing an output by pulse width modulating the output of the proportional integration compute circuit and controlling the rotation speed of the motor by the output, and a gain selector for selecting one of the proportional gains and one of the integral gains beforehand according to a value set by the speed setter.

The above and other objects, features and advantages of the present invention will become more apparent from the following detailed description taken with the accompanying drawings.

BRIEF DESCRIPTION OF THE DRAWINGS

FIG. 6 is a flowchart demonstrating the operation associated with FIG. 4;

FIG. 7 is a diagram showing a specific construction of a PI compute circuit for performing proportional integration.

DESCRIPTION OF THE PREFERRED EMBODIMENTS

With the device for controlling motor rotation speed of the present invention is susceptible of numerous physical embodiments, depending upon the environment and requirements of use, substantial numbers of the herein shown and described embodiments have been made, tested and used, and all have performed in an eminently satisfactory manner.

Figure 1:
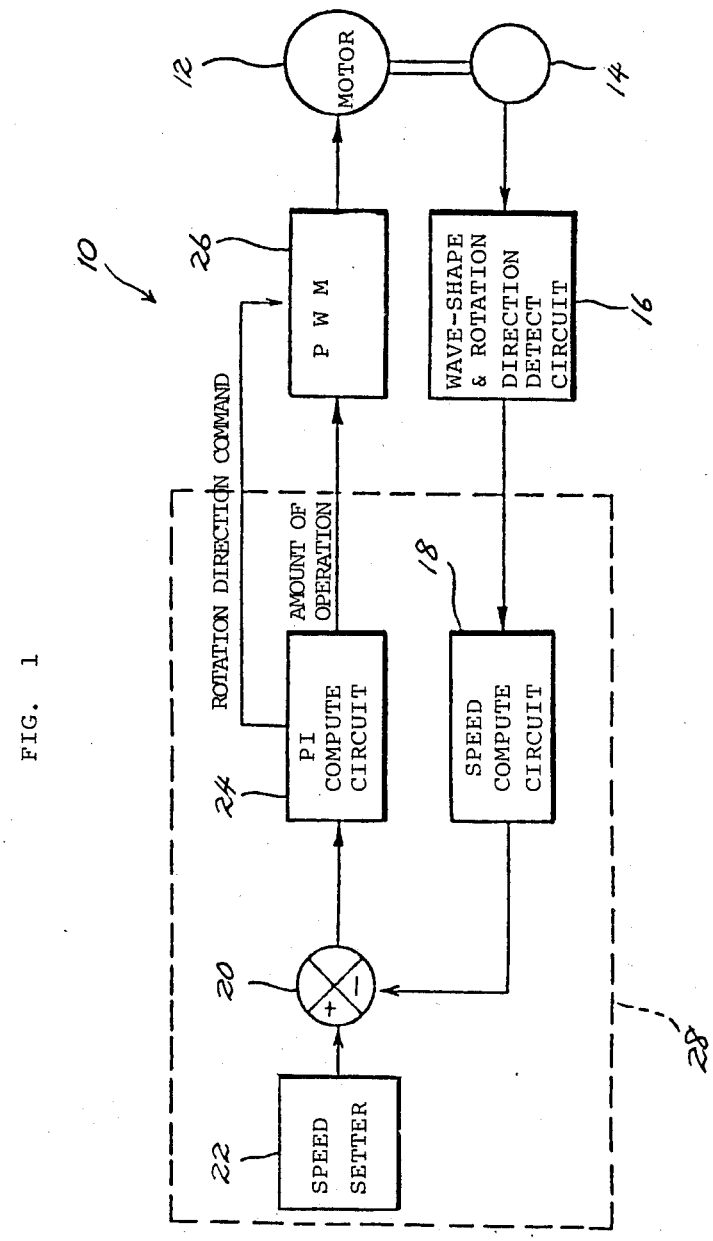
FIG. 1 is a functional block diagram of a motor speed control device embodying the present invention.
Figure 2:
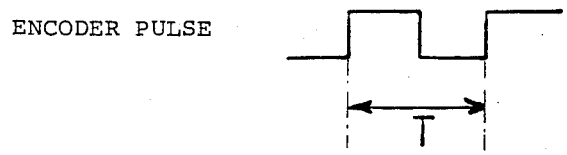
FIG. 2 shows a waveform representative of intervals of pulses which are outputted by an encoder.

Referring to FIG. 1 of the drawings, there is shown in a block diagram a feedback control circuit which constitutes a motor rotation speed control device of the present invention. The control device, generally 10, functions to control the rotation speed of a DC motor 12 which is provided with a rotary encoder 14. Output pulses of the rotary encoder 14 are wave-shaped by an wave-shape and rotation direction detect circuit 16 the output of which is applied to a speed compute circuit 18. The speed compute circuit 18 computes a motor speed based on a width of the output pulses of the rotary encoder 14 and applies a result of the computation to a compare circuit, or comparator, 20. The comparator 20 compares the output of the circuit 18 with an output signal of a speed setter 22 which is adapted to set a rotation speed of the motor 12. The output of the comparator 20 is fed to a proportional integration (IP) control compute circuit, or PI compute circuit, 24. The PI compute circuit 24 amplifies and integrates the input speed difference and delivers the result to a pulse width modulation (PWM) circuit 26 as an amount of operation. Also applied to the PWM circuit 26 is a rotation direction command from the PI compute circuit 24. In this construction, the circuit which directly controls the motor 12 is the PWM circuit 26. The feedback control loop having the above construction controls the motor 12 such that a target motor speed is maintained.

The motor speed setter 22, comparator 20, PI compute circuit 24 and speed compute circuit 24 may be implemented together by a central processing unit (CPU) 28 in order to cause the CPU 28 to perform the computation therein.

The speed compute circuit 18 computes an actual rotation speed v of the motor 12 by dividing a reference value K by a time T which is an interval between negative-going edges (or positive-going edges) of output pulses of the encoder 14. Here, the reference value K represents a gain of the speed compute circuit 18. The PI compute circuit 24 determines a P constant and an I constant which match with the gain of the circuit 18. That is, the motor speed v can be selected to $0.999 \times v$, $0.998 \times v$ and $1.001 \times v$ by manipulating the reference value K in the speed compute circuit 18. Paying attention to this point, the present invention realizes fine motor speed adjustment which involves manipulation of the reference value K.

Figure 3:
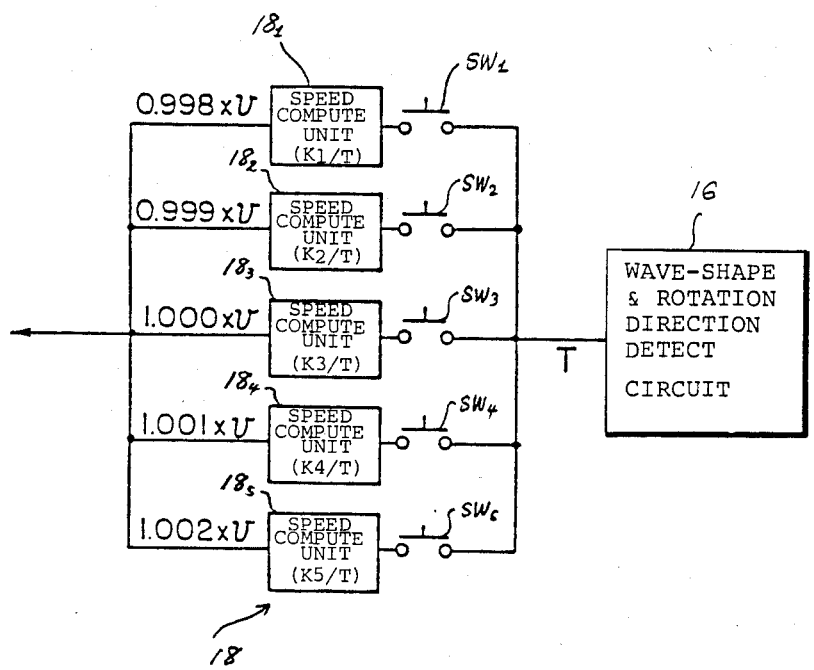
FIG. 3 is a functional block diagram showing a specific construction of a speed compute circuit adapted for fine adjustment of motor speed.

Referring to FIG. 3, a specific construction of the speed compute circuit 18 which fulfills the manipulation of the reference value K is shown. As shown, the circuit 18 includes a necessary number of speed compute units, five units $18_1$–$18_5$ in this particular construction, to which reference values $K_1$–$K_5$ are assigned, respectively. Switches $SW_1$–$SW_5$ respectively are associated with the speed compute units $18_1$–$18_5$ to select the latter one at a time. Each of the reference values $K_1$–$K_5$ is divided by a time T which is applied from the wave-shape and rotation direction detect circuit 16, thereby computing a desired motor rotation speed. Specifically, as shown in FIG. 3, assuming that the reference value $K_1=0.998$, $K_2=0.999$, $K_3=1.000$, $K_4=1.001$, and $K_5=1.002$, motor speeds associated with the reference values respectively are $v_1=0.998 \times v$, $v_2=0.999 \times v$, $v_3=1.000 \times v$, $v_4=1.001 \times v$ and $v_5=1.002 \times v$. This means finely adjusting the rotation speed v of the motor on a 0.1% order. As previously stated, the reference values K are selected one at a time by actuating the switches $SW_1$–$SW_5$.

While this particular embodiment is constructed to compute a motor rotation speed relying on output pulses of the rotary encoder 14, i.e., time T applied via the circuit 16, any other detection system may be used insofar as it is capable of changing the gain.

Figure 4:
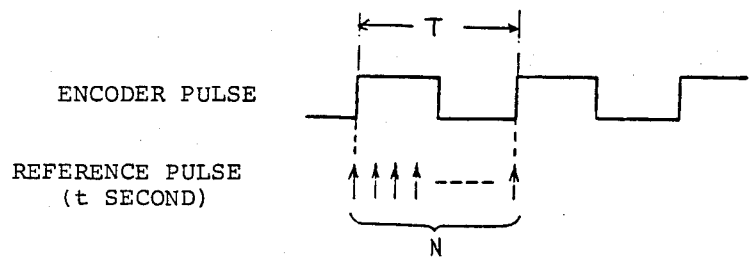
FIG. 4 shows a waveform useful for describing another specific construction in accordance with the present invention adapted for fine adjustment of motor speed.
Figure 5:
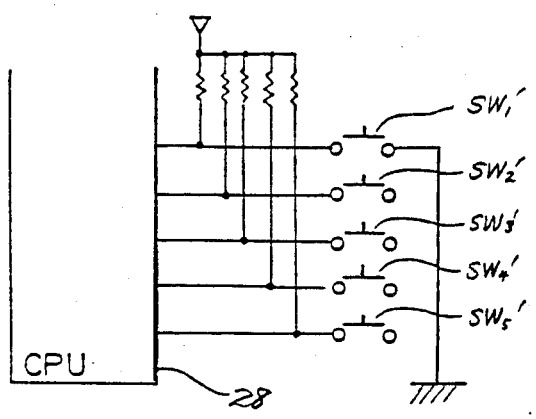
FIG. 5 is a block diagram associated with the waveform of FIG. 4.

Referring to FIGS. 4, 5 and 6, another specific construction which implements the above-described function by means of computation performed inside of the CPU 28 is shown. As shown in FIG. 4, the interval T of output pulses of the rotary encoder 14 is obtainable from the number N of reference clock pulses (constant interval of t seconds) which are counted during a period between positive-going edges of the pulses as follows:

$$T = t \times N \text{(second)} \qquad \text{Eq. (2)}$$

As shown in FIG. 5, switches $SW'_1$–$SW'_5$ which correspond respectively to the switches $SW_1$–$SW_5$ of FIG. 3, for example, are connected to the CPU 28. Meanwhile, as shown in the flowchart of FIG. 6, depending upon the ON/OFF statuses of the switches $SW'_1$–$SW'_5$ connected to the CPU 28, reference values $K'_1$–$K'_5$ filed beforehand and corresponding respectively to the previously mentioned $K_1$–$K_5$ are substituted for in an EA register of the CPU 28. At the same time, a time T produced by the Eq. (2) is substituted for in an A register of the CPU 28. Then, a division $K \div T$ is executed to provide a compensated motor speed v.

As described above, by realizing motor speed adjustment as fine as the order of 0.1% by means of internal computation of the CPU 28, it is possible to attain the object without resorting to extra circuits, that is, merely by installing switches for adjustment. In addition, a circuit construction which has been difficult to implement with an analog circuit is realized by use of a CPU.

Figure 8:
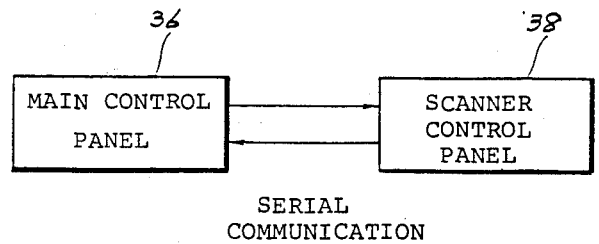
FIG. 8 is a block diagram representative of an application of the device of the present invention to a copier in which the PI function of FIG. 7 is assigned to a central processing unit (CPU).

Next, a specific construction of the PI compute circuit 24 included in the control device of the present invention will be described with reference made to FIGS. 7 and 8.

Now, in the PI compute circuit 24 of FIG. 1, a basic control equation in an analog adjustment system is as follows:

$$P = K\left(e + \frac{1}{T_I} e \cdot dt\right) \quad \text{Eq. (3)}$$

where P is an output amount of operation, K a proportional gain, $T_I$ an integration time, and e an error.

Usually, where it is desired to rely on the internal computation of a CPU for the PI computation, it is difficult to directly adopt the Eq. (3) and, for this reason, a difference type control equation as shown below:

$$P_n = K_p e_n + \Sigma K_I e_n \quad \text{Eq. (4)}$$

where $K_p$ is a proportional gain, $K_I$ an integral gain, suffix n a sampling point.

It has been customary to determine the above-mentioned gains by using the Ziegler and Nichols method which determines K and $T_I$ or $K_p$ and $K_I$ based on step response or the limit sensitivity method which determines an oscillation limit. However, The Ziegler and Nichols method provides a gain by applying a 100% step input to a target value, while the limit sensitivity method adopts an oscillation limit at a target value. Hence, where the target value of the motor speed v needs to be varied over a wide range $V \leq v \leq 4V$, i.e., 50–200%, the gains set up by either one of the above known techniques are not always optimum over the whole range and sometimes become excessive and sometimes short.

In this manner, in the case where the motor rotation speed is varied over a wide range by a PI compute circuit which relies on the internal computation of a CPU, if the proportional constant $K_p$ and the integral constant $K_I$ were constant, unbalance would occur between a high speed range and a low speed range.

In light of the above, in this particular embodiment, when a target motor speed is to be set, one of a plurality of predetermined gains which is optimum for the target speed is selected based on target speed information and, thereafter, PI computation is performed using the selected gain so long as the target value remains unchanged. Specifically, such PI computation is implemented with the PI compute circuit 24 constructed as shown in FIG. 7. The circuit 24 comprises a gain select circuit 30 which is made up of proportional gain selector means 32 and integral gain selector means 34. Implementing the illustrated circuit by hardware is impractical because it would lead to the intricacy of construction. In contrast, implementing such a circuit by a software scheme successfully achieves the object without resorting to an extra circuit.

A specific embodiment with such a software scheme will be described with reference to FIG. 8 and a program list which is shown below.

For example, in order that a scanner installed in a copier may perform variable magnification motions, the rotation speed v of a motor associated therewith needs to be variably controlled over the range as represented by the Eq. (1). Stated another way, the motor speed has to be controlled over the range of 50–100% with respect to a normal speed of 100%. Generally, motor speed data are in most cases are exchanged between a main control panel 36 and a scanner control panel 38 by serial communication; after the transfer of motor speed data, the scanner is moved at the same speed until the transfer of the next data. Hence, an optimum gain is automatically determined by executing a gain setting program at the instant when the motor speed data has arrived.

The program is presented using the assembly language of μPD 7811, a CPU available from NEC Corporation. While the description will concentrate to the proportional gain $K_p$ for simplicity, the same means is applicable to the integral gain $K_I$ as well.

| PROGRAM LIST | | | | |
|---|---|---|---|---|
| 01 | ; | | | |
| 02 | ; | SET PROPORTIONAL GAIN | | |
| 03 | ; | | | |
| 04 | | LBCD | TARGET | ; TARGET SPEED |
| 05 | | DMOV | EA, B | |
| 06 | | LXI | B, 100 | |
| 07 | | DGT | EA, B | |
| 08 | | JRE | GAIN1 | |
| 09 | | LXI | B, 200 | |
| 10 | | DGT | EA, B | |
| 11 | | JRE | GAIN2 | |
| 12 | | LXI | B, 300 | |
| 13 | | DGT | EA, B | |
| 14 | | JR | GAIN3 | |
| 15 | GAIN0: | MVI | A, 40 | ; 300 < TARGET |
| 16 | GAIN3: | MVI | A, 30 | ; 200 < TARGET < 300 |
| 17 | GAIN2: | MVI | A, 20 | ; 100 < TARGET < 200 |
| 18 | GAIN1: | MVI | A, 10 | ;         TARGET < 100 |
| 19 | | STAW | GAIN | |

Referring to the program, in the fourth line, speed data TARGET which is fed from the main control panel 36 is loaded in a BC register. Then, in the fifth to the fourteenth lines, branching to any one of addresses GAIN0–GAIN3 which stores a gain matching with the speed data occurs. Here, the operation represented by the fifteenth to the eighteenth lines is sometimes referred to as a vertical stack command; the value loaded in the A register is a value loaded first. For example, when branching has occurred to GAIN 3, "30" is substituted for in the A register and the following "20" and "10" are neglected. Finally, the content of the A register is written into an IN address on a RAM, followed by the next processing. Therefore, at the time of the next PI operation, it suffices to load the value of the GAIN address as a proportional gain.

Although the illustrative embodiment has employed PI control as a basis, the same technique is usable even if the PI control is extended to PID control which involves a differential term.

In summary, it will be seen that the present invention achieves various advantages as enumerated below.

(1) Motor speed can be finely controlled on, for example, a 0.1% basis while maintaining the precision of set values on an 1% order and without the need for higher accuracy of speed computation and PI computation. In addition, there is no need for compensation despite a change of the set value.

(2) Since the gain is changed outside of a PI computation routine, the controllability over the PI computation is not effected.

(3) The construction is simple and, therefore, cost-effective.

Various modifications will become possible for those skilled in the art after receiving the teachings of the present disclosure without departing from the present invention.

What is claimed is:

1. A control device for varying a rotation speed of a motor within a predetermined range, comprising:
   speed set means for setting a desired rotation speed of the motor and producing an output representation of the set rotation speed;
   rotary encoder means operatively connected to the motor for generating a pulse signal having a pulse width which is associated with a rotation speed of the motor;
   speed compute means for computing an actual rotation speed of the motor from the pulse width of the pulse signal outputted by said rotary encoder means and producing an output representative of the actual rotation speed, said speed comput means having a constant for computation;
   compare means for comparing the computed rotation speed outputted by said speed compute means with the set value outputted by the speed set means and producing a difference signal representative of a difference between the computed rotation speed and the set value;
   proportional integration compute means for performing proportional integration responsive to the difference signal outputted by said compare means and producing an output representative of an amount of operation based on a result of the computation;
   pulse width modulator means for producing an output by pulse width modulating the output of said proportional integration computate means and controlling the rotation speed of the motor by the output; and
   constant change means for changing the constant of the speed compute means.

2. A control device as claimed in claim 1, wherein the constant of the speed compute means is variable.

3. A control device as claimed in claim 2, wherein the constant of the constant change means is a value produced by dividing a reference value of the speed compute means by an interval between positive-going edges or negative-going edges of the pulse signal outputted by the rotary encoder means.

4. A control device as claimed in claim 3, wherein the constant change means comprises a predetermined plurality of speed compute units each of which generates a value by dividing a particular reference value, which are different from the others, by the interval.

5. A control device as claimed in claim 4, wherein the constant change means further comprises switch means for selecting said speed compute units one at a time and applying the interval to said selected speed compute unit only.

6. A control device as claimed in claim 5, wherein said switch means comprises switches which are connected to the speed compute units in one-to-one correspondence.

7. A control device as claimed in claim 6, wherein the functions of the speed sete means, the proportional integration computate means and the speed compute means are implemented by computation which is performed inside of a central processing unit.

8. A control device as claimed in claim 1, wherein the proportional integration compute means comprises gain selector means for selecting a plurality of proportional gains and a plurality of integration gains one at a time each, according to a value which is set by the speed set means.

9. A control device for varying a rotation speed of a motor within a predetermined range, comprising:
   speed set means for setting a desired rotation speed of the motor and producing an output representative of the set rotation speed;
   rotary encoder means operatively connected to the motor for generating a pulse signal having a pulse width which is associated with a rotation speed of the motor;
   speed compute means for computing an actual rotation speed of the motor from the pulse width of the pulse signal outputted by said rotary encoder means and producing an output representative of the actual rotation speed;
   compare means for comparing the computed rotation speed outputted by said speed compute means with the set value outputted by the speed set means and producing a difference signal representative of a difference between the computed rotation speed and the set value;
   proportional integration compute means for performing proportional integration responsive to the difference signal outputted by said compare means and producing an output representative of an amount of operation based on a result of the computation, said proportional integration compute means having a plurality of proportional gains and a plurality of integral gains;
   pulse width modulator means for producing an output by pulse width modulating the output of said proportional integration compute means and controlling the rotation speed of the motor by the output; and
   gain selector means for selecting one of the proportional gains and one of the integral gains beforehand according to a value set by the speed set means.

10. A control device as claimed in claim 9, wherein the functions of the speed set means, the proportional integration compute means and the speed compute means are implemented by computation performed inside of a central processing unit.

* * * * *